H. H. CHARLES.
INCUBATOR.
APPLICATION FILED SEPT. 8, 1908.
927,711.
Patented July 13, 1909.
2 SHEETS—SHEET 1.
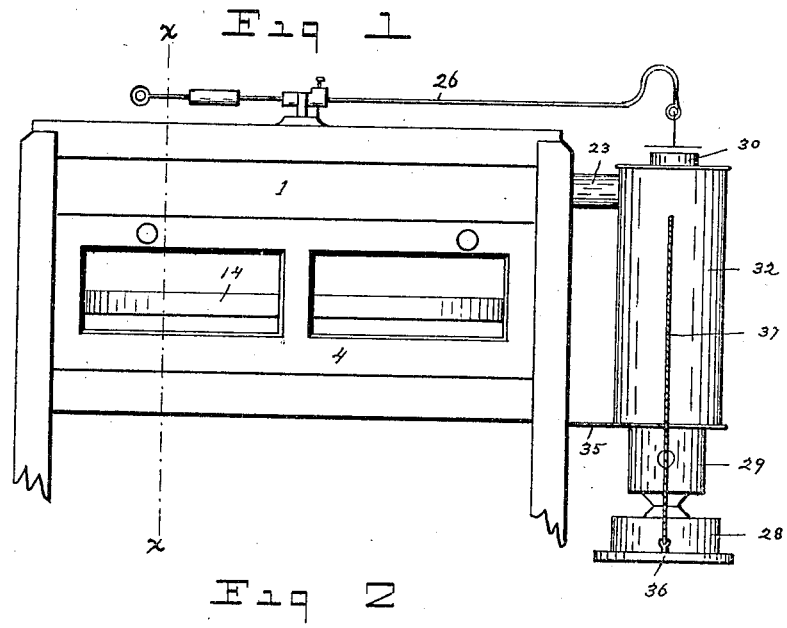
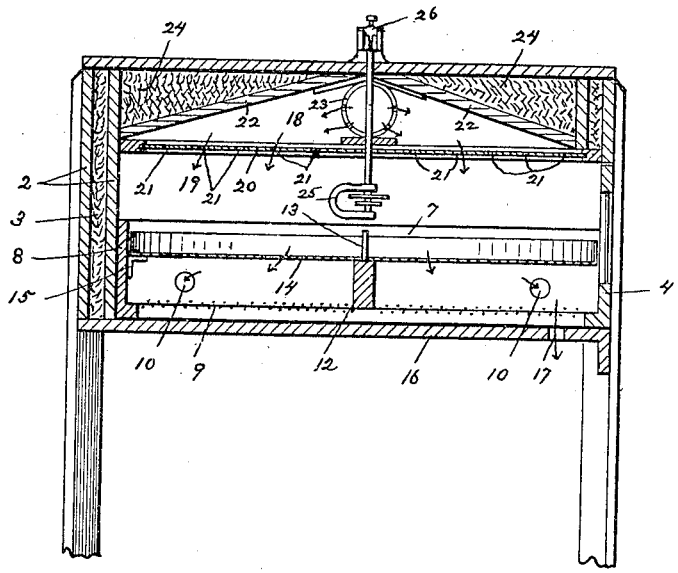
WITNESSES:
James E. Boyle
Mabel L. Lefevre
INVENTOR
HENRY H. CHARLES.
BY
John J. Thompson
ATTORNEY H. H. CHARLES.
INCUBATOR.
APPLICATION FILED SEPT. 8, 1908.
927,711.
Patented July 13, 1909.
2 SHEETS—SHEET 2.
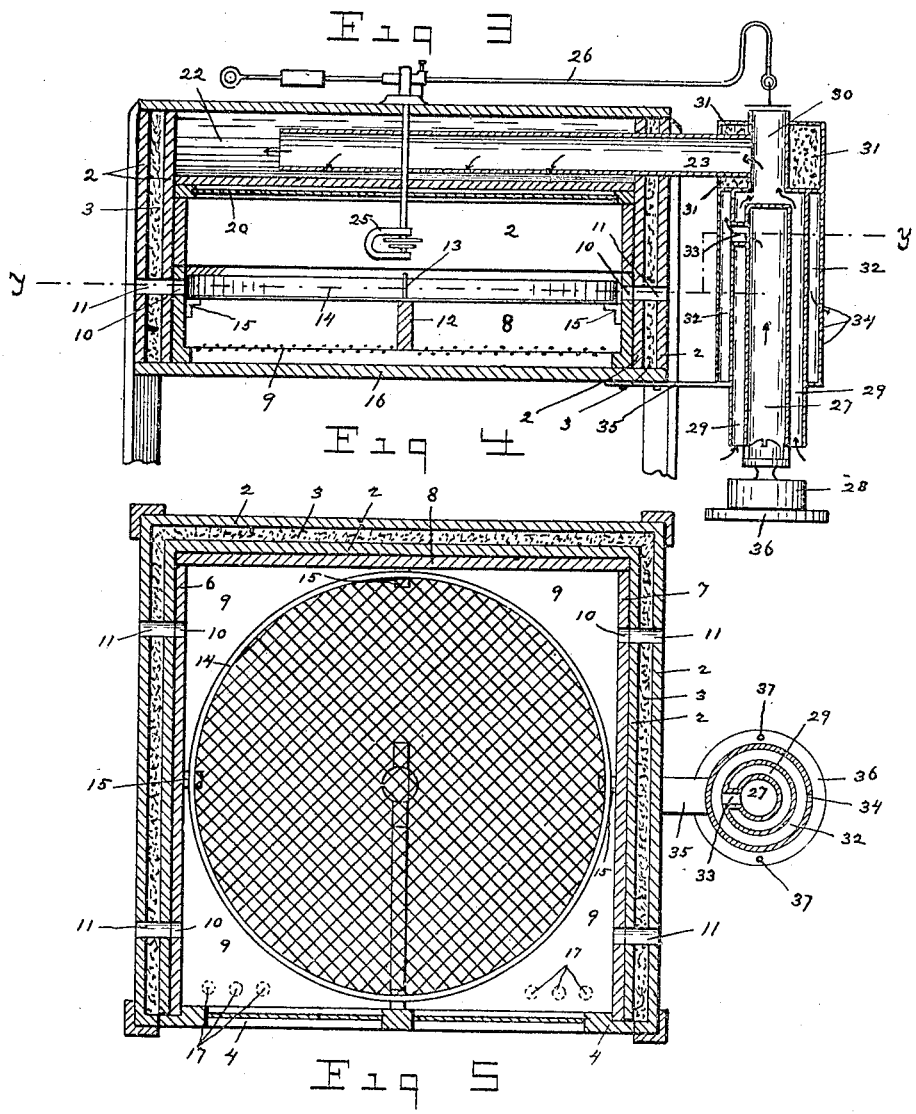
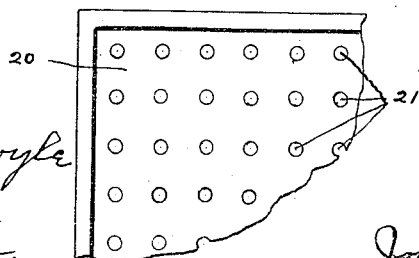
WITNESSES:
James E. Boyle
Mabel L. Lefevre
INVENTOR
HENRY H. CHARLES.
BY
John J. Thompson
ATTORNEY

UNITED STATES PATENT OFFICE.

HENRY H. CHARLES, OF MANOR TOWNSHIP, LANCASTER COUNTY, PENNSYLVANIA.

INCUBATOR.

No. 927,711.  Specification of Letters Patent.  Patented July 13, 1909.

Application filed September 8, 1908. Serial No. 452,077.

*To all whom it may concern:*

Be it known that I, HENRY H. CHARLES, a citizen of the United States, residing at Manor township, in the county of Lancaster and State of Pennsylvania, have invented certain new and useful Improvements in Incubators, of which the following is a specification, reference being had therein to the accompanying drawing.

My invention relates to incubators of that class which are designed to be operated by the circualtion of hot air through the egg chamber.

The objects of the invention are to provide improved means for regulating the temperature of the air in the incubator, and also to improve the quality of the air admitted with respect to both the amount of oxygen and the amount of moisture therein, as it is a well known fact that a proper supply of oxygen and moisture in the air admitted to incubators is essential, and the former is supplied by an improved construction whereby the air does not come in contact with the heated flame, but is carried through separate compartments in the heater, so that no fumes pass into the egg chamber, and a proper amount of moisture is there retained.

The invention further comprises separate heating and egg chambers, divided by a perforated diaphragm so arranged as to evenly admit the heated air to all parts of the egg chamber. The egg chamber is further provided with a drawer formed with a screen bottom and provided with a central support upon which is detachably and rotatably mounted a circular egg tray in such a manner that the drawer may be partly drawn out from the machine and the tray revolved to facilitate the turning and cooling of the eggs. In this manner it will be seen that the eggs secure an even distribution of heat as it is a well known fact that the corners of an incubator are the hardest to supply with an even heat, and also by my improved design of drawer and tray the capacity of the egg tray is not diminished as by eliminating the usual slats and spaces and by utilizing the open corners as a means for the chicks to gain access to the nursery under the tray I have just as much space for eggs as machines of the old design. I also provide air ducts in the bottom of the incubator as an outlet for foul air, and also air ducts in the sides of the incubator, connecting the egg chamber with the outer air which serves as another outlet for the foul air to escape, and which may be regulated by caps or covers.

Reference is to be had to the accompanying drawings, forming part of this specification, and in which similar figures designate corresponding parts in all the drawings, but it is fully understood that I do not confine myself to the exact construction as shown, as slight changes may be made in the construction and combination of parts without departing from the spirit of the invention.

In the drawings:—Figure 1, is a front elevation of my improved incubator showing the method of attaching the lamp and support to the heater. Fig. 2, is a vertical cross section on the line X—X of Fig. 1, showing the construction of the case. Fig. 3, is a vertical longitudinal section showing the construction of the heater in detail. Fig. 4, is a horizontal section on the line Y—Y of Fig. 3, and shows the detail of the egg tray. Fig. 5, is an enlarged partial view of the heat distributing diaphragm.

Referring more particularly to the parts illustrated, 1, indicates the body of the incubator, which is of the usual form, consisting, substantially, of a box, the walls 2, of which are formed with packing-spaces and are packed with a non-conductor 3. The door 4, forming the front of the chick drawer 5, which is provided with the sides 6, and 7, and back 8, and the screen bottom 9, which may be covered with felt or burlap. The sides 6, and 7, of said drawer are provided with orifices 10, which, when the drawer is in a closed position, register with the vents or ducts 11, which pierce the sides of the case 1, and allow the foul air to escape and also the moisture given off from the eggs. Said drawer 5, is further provided with the support 12, from the upper surface of which, at a central point of said drawer, projects the pivot-pin 13, upon which is rotatably mounted the circular egg tray 14, and which is further supported by the brackets 15, secured to the sides 6, and 7, and end 8, of said drawer 5. The bottom 16, of said incubator case 1, is further provided, near the forward end thereof, with the vents 17, for the escapement of the foul air. The interior of said incubator is divided into a heating chamber 18, and an egg chamber 19, by the heat-diffusing diaphragm 20, which is provided with a series of holes 21, which may be arranged in any suitable manner for the proper distribution of the heat. The heating chamber 18, is provided with the deflector-boards 22, which tend to deflect the heat toward the sides as it is received from the main heating pipe 23, while said deflector-boards 22, are backed with the non-conducting packing 24. Said egg chamber 19, is provided with the usual thermostat 25, which is connected with the regulating bar 26, in the usual way for the regulation of the heat admitted to said egg chamber.

The improved heater forming part of my device is constructed of a flame or smoke flue 27, closed at the top and detachably connected at the bottom to the heating lamp 28, said smoke flue 27, being surrounded by the air chamber 29, which is open at the bottom and formed at the top with the neck 30, open at the upper end thereof and communicating at its side with the main heater pipe 23, while said neck 30, and the end of said heater pipe 23, are surrounded by the packing 31, while surrounding said air chamber is the outer smoke flue 32, which is closed at both ends and provided with the passage 33, near the upper end thereof which communicates with the inner smoke flue 27, and said outer flue 32, is also pierced through its outer wall near the bottom thereof by the orifices 34, for the escapement of the smoke and fumes, said heater being attached to the incubator case 1, by the main heater pipe 23, and the bracket 35, while the heating lamp 28, is supported by the shelf 36, which is retained in place by the action of the springs 37, which are attached to said shelf 36, and to the outer wall 32.

The general operation of the device being so well known it will not be necessary to explain in detail the operation, except as modified by my improved construction, which is as follows:—The air entering the bottom of the flue 29, passes upward over the heated dome of the smoke flue 27, thence through the flue 23, to the heating chamber of the incubator. Said air being quickly heated by the action of the smoke and flame being carried within and without said air chamber and the air having to pass over the dome which is the hottest part of the heater and which is also packed with a non-conductor. The heated air as it passes through the flue 23, is allowed to escape through the open end and perforation in the side thereof into the heating chamber and thence downward through the diffusing diaphragm 20, to the egg chamber where the foul air descends through the screen bottom 9, to the bottom 16, and escapes through the vents 17, and if it is desired to allow more moisture to escape the vents 11, are opened as well.

Having thus described my invention what I claim as new and desire to secure by Letters Patent is:—

1. In an incubator of the class described, comprising a casing having vents in the bottom and side thereof, a chick drawer formed with a screen bottom and slidably mounted within said case, the sides of said drawer provided with orifices designed to register with the vents in the sides of said case when the drawer is in closed position, a revolving egg tray mounted within said drawer.

2. In an incubator of the class described, comprising a casing provided with air ducts in its sides and bottom, a chick drawer formed with a perforated bottom, said drawer being slidably mounted within said casing, the side walls of said drawer being pierced by orifices which communicate with the air ducts in the side walls of said casing when said drawer is in a closed position, a pivot stud secured to the center of said drawer, a circular egg tray rotatably mounted upon said pivot, brackets secured to the side walls of said drawer and supporting said egg tray.

3. In an incubator of the class described, comprising a casing provided with suitable heating means, a chick drawer slidably mounted within said casing, air ducts formed in the walls of said drawer and air vents formed in the side walls of said casing, and registering with the vents in said drawer, a screen bottom secured to said drawer and forming part of the same, a central supporting pivot-post secured to said drawer, a circular egg tray rotatably mounted upon said pivot-post.

In testimony whereof I affix my signature in presence of two witnesses.

HENRY H. CHARLES.

Witnesses:
  WM. J. COULTER,
  MABEL L. LEFEVRE.